United States Patent
Tsuneda et al.

(10) Patent No.: US 12,361,969 B1
(45) Date of Patent: Jul. 15, 2025

(54) MAGNETIC DISK APPARATUS AND METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Hidetoshi Tsuneda, Yamato Kanagawa (JP); Kazuya Takada, Chigasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 18/809,938

(22) Filed: Aug. 20, 2024

(30) Foreign Application Priority Data

Mar. 19, 2024 (JP) .................. 2024-043039

(51) Int. Cl.
G11B 5/596 (2006.01)
G11B 5/00 (2006.01)
G11B 5/012 (2006.01)
G11B 5/02 (2006.01)

(52) U.S. Cl.
CPC .......... *G11B 5/59644* (2013.01); *G11B 5/012* (2013.01); *G11B 5/02* (2013.01); *G11B 5/59627* (2013.01); *G11B 5/59655* (2013.01)

(58) Field of Classification Search
CPC .. G11B 5/00; G11B 20/10; G11B 5/09; G11B 20/12; G11B 15/02; G11B 19/02; G11B 15/087; G11B 5/59633; G11B 5/59627; G11B 5/59665; G11B 5/59655
USPC ...................................... 360/77.08
See application file for complete search history.

(56) References Cited

U.S. PATENT DOCUMENTS

| 8,040,631 | B2 | 10/2011 | Hampshire |
| 8,848,303 | B1 | 9/2014 | Yamada |
| 8,854,761 | B1 | 10/2014 | Katchmart et al. |
| 11,557,320 | B1 * | 1/2023 | Katchmart ......... G11B 5/59666 |
| 2022/0084549 | A1 | 3/2022 | Kawabe |

FOREIGN PATENT DOCUMENTS

JP 2022-047914 A 3/2022

* cited by examiner

*Primary Examiner* — Nabil Z Hindi
(74) *Attorney, Agent, or Firm* — Knobbe, Martens, Olson & Bear, LLP (57) ABSTRACT

A magnetic disk apparatus according to an embodiment includes a magnetic disk, a magnetic head, a second memory, and a controller. On the magnetic disk, a servo sector where first servo data is recorded is provided. The magnetic head writes data and reads data to and from the magnetic disk. The first memory stores data to be written and stores data read from the magnetic disk. The second memory stores second servo data. The controller acquires the second servo data corresponding to the first servo data from the second memory based on the first servo data read by the magnetic head when passing over the servo sector. The controller executes positioning control of the magnetic head by using the first servo data and the second servo data.

12 Claims, 6 Drawing Sheets

MAGNETIC DISK APPARATUS AND METHOD

CROSS-REFERENCE TO RELATED APPLICATIONS

This application is based upon and claims the benefit of priority from Japanese Patent Application No. 2024-043039, filed on Mar. 19, 2024; the entire contents of which are incorporated herein by reference.

FIELD

Embodiments described herein relate generally to a magnetic disk apparatus and a method.

BACKGROUND

In a conventional magnetic disk apparatus, servo data stored on a magnetic disk is read by a magnetic head to position the magnetic head. Occurrence of read error of servo data by the magnetic head may lead to a retry process for attempting to read the servo data again from the same position after one rotation of the magnetic disk, causing waiting time.

DETAILED DESCRIPTION

According to an embodiment, a magnetic disk apparatus includes a magnetic disk, a magnetic head, a second memory, and a controller. On the magnetic disk, a servo sector where first servo data is recorded is provided. The magnetic head is configured to write data and read data to and from the magnetic disk. The first memory is configured to store data to be written and store data read from the magnetic disk. The second memory is configured to store second servo data. The controller is configured to acquire the second servo data corresponding to the first servo data from the second memory based on the first servo data read by the magnetic head when passing over the servo sector. The controller is configured to execute positioning control of the magnetic head by using the first servo data and the second servo data.

The magnetic disk apparatus according to embodiments will be described in detail below with reference to the accompanying drawings. It should be noted that the present disclosure is not limited to these embodiments.

First Embodiment

Figure 1:
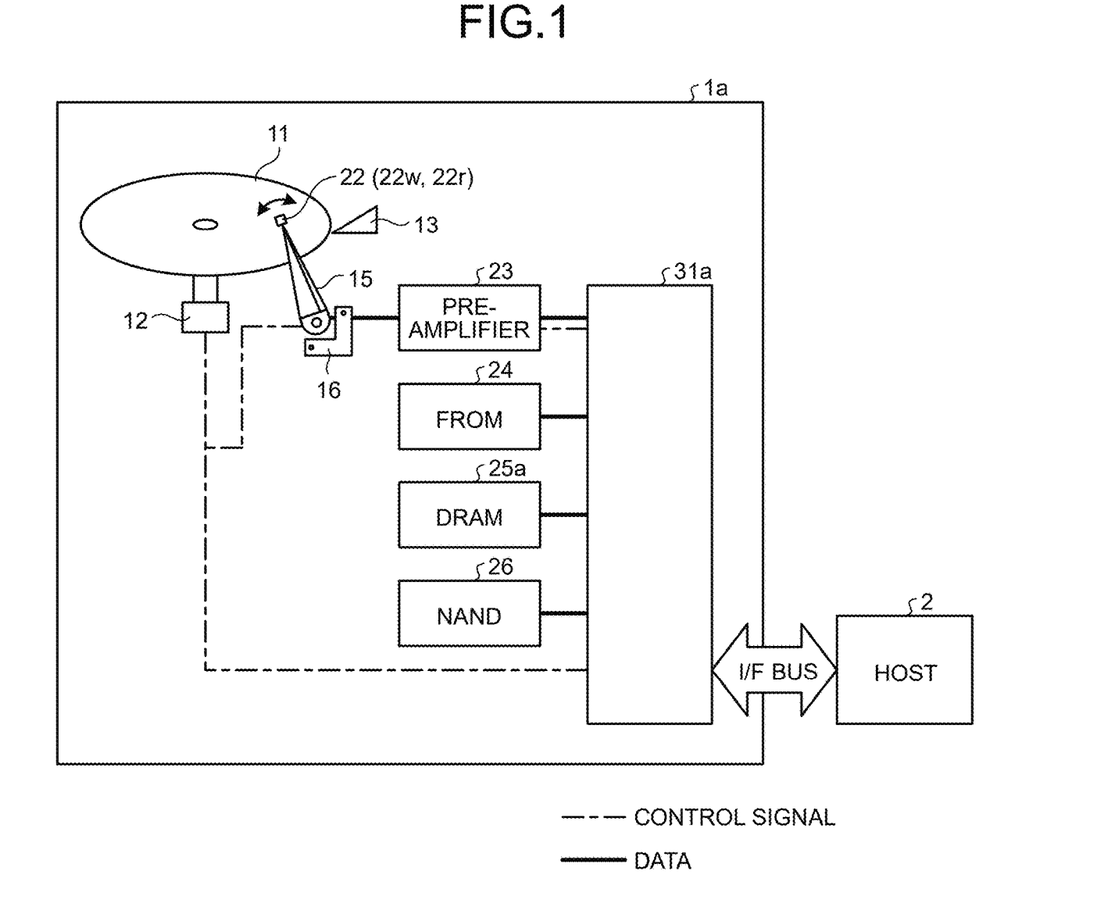
FIG. 1 is a schematic diagram illustrating an exemplary configuration of a magnetic disk apparatus according to a first embodiment.

FIG. 1 is a schematic diagram illustrating an exemplary configuration of a magnetic disk apparatus 1a according to a first embodiment.

The magnetic disk apparatus 1a is connected to a host 2. The magnetic disk apparatus 1a is configured to receive an access command from the host 2. The access command is, for example, a write command or a read command.

The magnetic disk apparatus 1a includes a magnetic disk 11 having a surface on which a magnetic layer is formed. The magnetic disk apparatus 1a accesses the magnetic disk 11 in accordance with the access command. The access includes writing of data and reading of data. Specifically, the writing and reading of data are performed by a magnetic head 22.

In addition to the magnetic disk 11, the magnetic disk apparatus 1a includes a spindle motor (SPM) 12, a ramp 13, an actuator arm 15, a voice coil motor (VCM) 16, a magnetic head 22, a preamplifier 23, a flash read only memory (FROM) 24, a dynamic random access memory (DRAM) 25, a NAND flash memory (hereinafter referred to as NAND) 26, and a system-on-a-chip (SoC) 31a.

The magnetic disk 11 is rotated at a predetermined rotation speed by the SPM 12 coaxially mounted.

The magnetic head 22 writes and reads data to and from the magnetic disk 11 by using a write head 22w and a read head 22r that are provided in the magnetic head 22. The magnetic head 22 is fixed to an end of the actuator arm 15. The magnetic head 22 is moved in a radial direction of the magnetic disk 11 by the VCM 16. Either one or both of the write head 22w and the read head 22r may be plurally provided in a single magnetic head 22.

In a case such as that the rotation of the magnetic disk 11 is stopped, the magnetic head 22 is moved onto the ramp 13. The ramp 13 holds the magnetic head 22 at a position spaced away from the magnetic disk 11.

The preamplifier 23 is an integrated circuit that controls writing and reading of the data performed by the magnetic head 22. The preamplifier 23 amplifies a signal read from the magnetic disk 11 by the magnetic head 22 and supplies the signal to the SoC 31a during read operation. Additionally, the preamplifier 23 amplifies a signal corresponding to the data to be written supplied from the SoC 31a and supplies the signal to the magnetic head 22 during write operation.

The FROM 24 stores a firmware program, various setting information, and the like. Note that the firmware program may be stored on the magnetic disk 11.

The DRAM 25a is a volatile memory. The DRAM 25a is used as a buffer for storing data that is transmitted and received to and from each unit. The DRAM 25a is used as a memory for operation of the SoC 31a. The DRAM 25a is used as an area where the firmware program is loaded and as an area where various types of management data are temporarily stored. The DRAM 25a is an example of the first memory.

The NAND 26 stores servo data for positioning control to move the magnetic head 22 to a target position of the magnetic disk 11. The servo data is separately stored in the NAND 26 and the above-described magnetic disk 11. The servo data will be described in detail later. The NAND 26 is an example of the second memory.

The SoC 31a is an integrated circuit that performs overall control of the magnetic disk apparatus 1a. The SoC 31a controls each unit in accordance with the firmware program stored in the FROM 24 or in the magnetic disk 11. Specifically, for example, the SoC 31a acquires the servo data stored in the NAND 26 and the magnetic disk 11, and executes a servo process of positioning the magnetic head 22 on the basis of the acquired servo data. The servo process includes a servo data acquisition process and a process related to the positioning control of the magnetic head 22 based on the servo data. The positioning control is control in which the SoC 31a estimates a current position of the magnetic head 22 on the basis of the servo data and brings the magnetic head 22 closer to the target position on the basis of the estimated current position. The positioning control includes seek operation control to move the magnetic head 22 toward a target track and tracking operation control to maintain the magnetic head 22 on the target track. The SoC 31a is an example of the controller.

Figure 2:
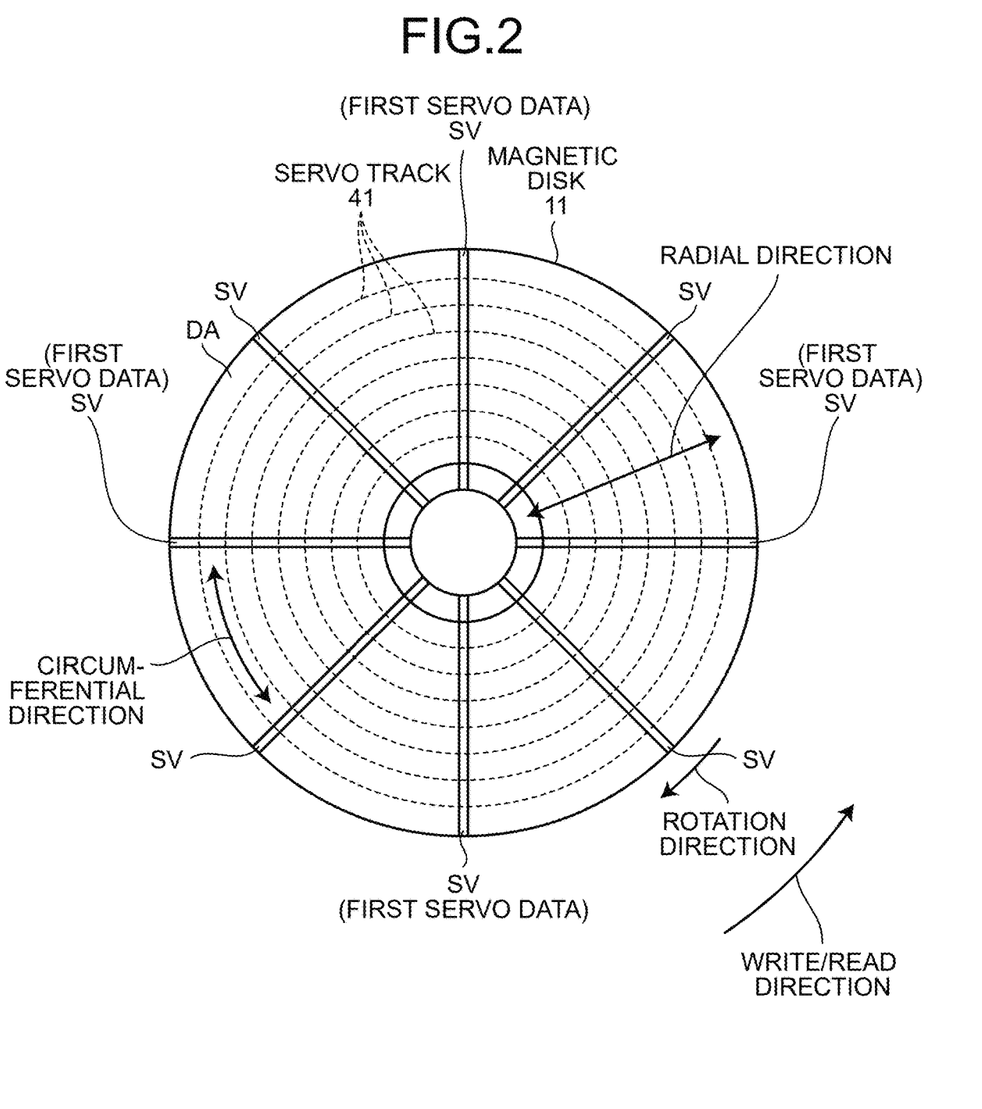
FIG. 2 is a schematic diagram illustrating an exemplary configuration of a magnetic disk according to the first embodiment.

FIG. 2 is a schematic diagram illustrating an exemplary configuration of the magnetic disk 11 according to the first embodiment. Note that this drawing illustrates an exemplary direction of rotation of the magnetic disk 11. The magnetic head 22 relatively moves against the magnetic disk 11 by the rotation of the magnetic disk 11. Therefore, a write/read direction, namely, a circumferential direction in which data is written or read by the magnetic head 22, is opposite to the rotation direction of the magnetic disk 11.

In the radial direction, a direction from the edge to the center of the magnetic disk 11 is an inner circumferential direction, and a direction from the center to the edge of the magnetic disk 11 is an outer circumferential direction.

The servo data that is used for positioning the magnetic head 22 is written to the magnetic disk 11 by, for example, a servo writer or self-servo writing in a manufacturing process. In FIG. 2, servo areas SV that are spaced radially in the radial direction and circumferentially at predetermined intervals are drawn as an example of the arrangement of the servo areas where the servo data are written. A space between two servo areas SV continuous in a circumferential direction is used as a data area DA where data is written.

In the radial direction of the magnetic disk 11A, servo tracks 41 are provided concentrically. Hereinafter, an area defined by each of the servo areas SV on each of the servo tracks 41 is referred to as a servo sector SV.

In the servo sector SV, a preamble, a servo mark, a gray code, and a burst pattern are recorded in this order in the write/read direction. The preamble, the servo mark, the gray code, and the burst pattern are each an example of the first servo data. Hereinafter, the preamble, the servo mark, the gray code, and the burst pattern are collectively referred to as the first servo data, in some cases. The first servo data is read when the magnetic head 22 passes over the servo sector SV.

The preamble is a single periodic pattern data that periodically changes in the circumferential direction.

The servo mark is pattern data for identifying read timing of the first servo data. The read timing of various servo data can be determined on the basis of detection timing of the servo mark.

The gray code includes a cylinder address for identifying each servo track 41 provided on the magnetic disk 11, and a sector address for identifying each servo sector SV on the servo track 41.

The burst pattern is pattern data that is used for detecting an offset amount of the position of the magnetic head 22 from a track center of a servo track 41 (exactly, a servo track 41 indicated by the cylinder address). The offset amount of the servo track 41 from the track center is called burst offset.

The gray code and the burst pattern are used for calculating a positional deviation amount of the magnetic head 22 from the track center of the shape of the servo track 41. An estimated position of the magnetic head 22 in the radial direction can be calculated on the basis of the cylinder address and the positional deviation amount obtained from each burst pattern.

Figure 3:
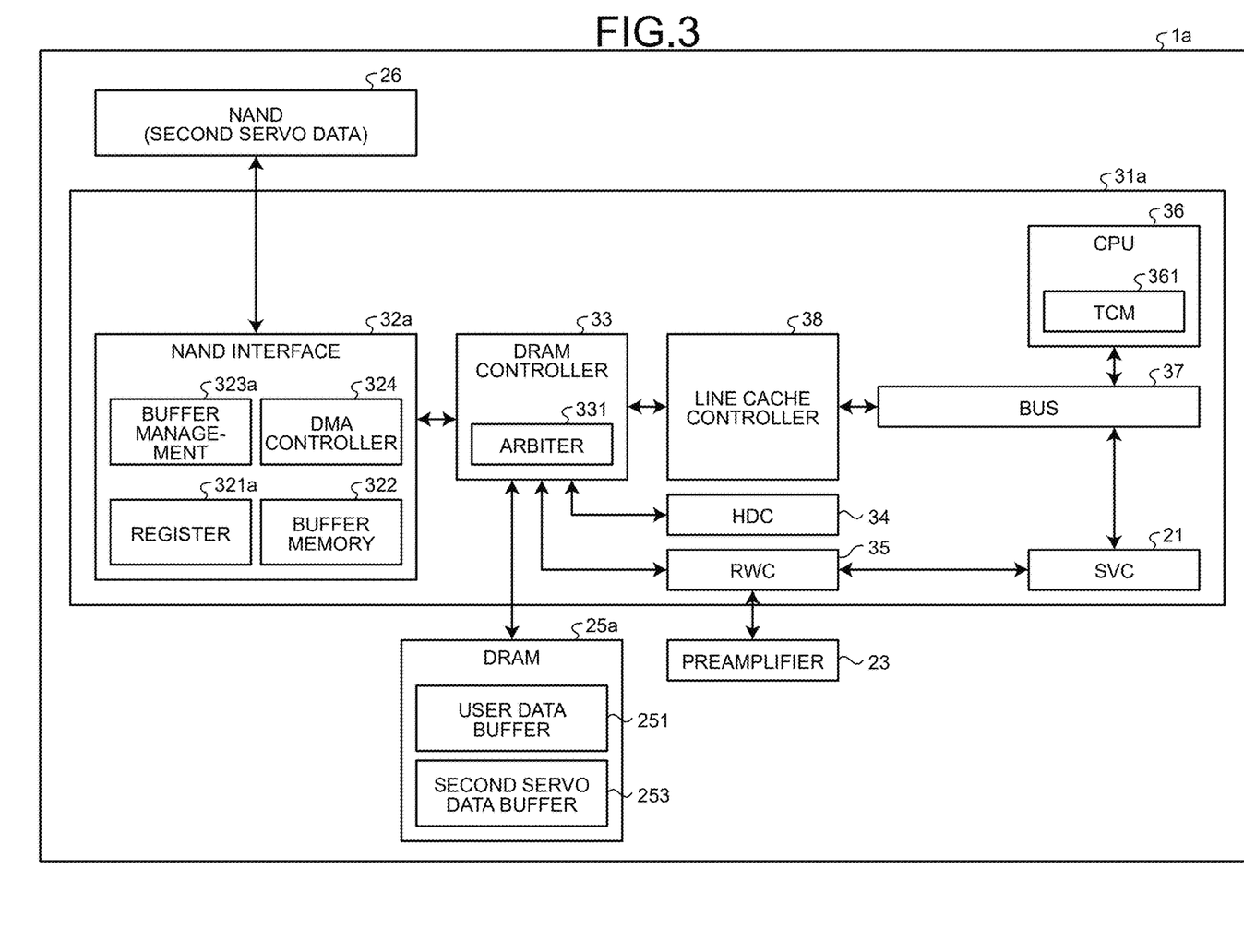
FIG. 3 is a block diagram illustrating an exemplary configuration of SoC according to the first embodiment.

FIG. 3 is a block diagram illustrating an exemplary configuration of the SoC 31a according to the first embodiment. As illustrated in FIG. 3, the SoC 31a includes a servo controller (SVC) 21, a NAND interface 32a, a DRAM controller 33, a hard disk controller (HDC) 34, a read/write channel (RWC) 35, a central processing unit (CPU) 36, a bus 37, and a line cache controller 38.

Some of or all the operations of the respective component elements of the SoC 31a, which will be described below, can be implemented by executing the firmware program by the CPU 36.

The NAND 26 is connected to the NAND interface 32a.

The NAND 26 stores a post code. The post code is an example of the second servo data. Hereinafter, the post code is referred to as the second servo data, in some cases.

The post code is data that indicates a correction amount of repeatable runout (RRO). More specifically, the post code is data for correcting the positional deviation from the track center with respect to the shape of the servo track 41 defined by the gray code and the burst pattern. The degree of the positional deviation changes in synchronization with the rotation of the magnetic disk 11.

In the manufacturing process of the magnetic disk apparatus 1a, the RRO is measured. Specifically, in the manufacturing process of the magnetic disk apparatus 1a, the RRO is learned for each servo track 41, and a learned value of the RRO for each servo track 41 is stored in the NAND 26 as the post code. In other words, the post code includes the learned value of the RRO defined for each servo track 41. An address is assigned to each post code stored in the NAND 26.

In the magnetic disk apparatus 1a, the first servo data read from the magnetic disk 11 and the second servo data read from the NAND 26 are used when positioning control of the magnetic head 22 is performed. Specifically, the estimated position of the magnetic head 22 in the radial direction, which is calculated on the basis of the cylinder address and the burst offset, is corrected by using an RRO correction value. In this manner, the estimated position of the magnetic head 22 in the radial direction is corrected. On the basis of the corrected estimated position, the magnetic head 22 is moved to a target data track.

The technical significance of the second servo data stored in the NAND 26 will be described with reference to a comparative example.

In a magnetic disk apparatus of the comparative example, the second servo data is recorded on a magnetic disk. Specifically, in the magnetic disk apparatus of the comparative example, the second servo data is recorded on a servo sector of the magnetic disk in an order subsequent to the first servo data. The first servo data and the second servo data are read by a magnetic head when passing over the servo sector, and are used for positioning control.

Meanwhile, in some magnetic disk apparatus, a read error caused by a magnetic disk may occur. For example, when a read error of servo data occurs, a retry process of attempting to read the servo data again from the same position after one rotation of the magnetic disk. Waiting for such rotation of the magnetic disk leads to deterioration in access performance to the magnetic disk. In the magnetic disk apparatus of the comparative example, all the servo data are recorded on the servo sector, and the read error occurs frequently.

In contrast, in the magnetic disk apparatus 1a of the present embodiment, the second servo data that is part of the servo data is stored in the NAND 26. This configuration makes it possible to avoid occurrence of the read error with respect to at least the second servo data. Therefore, frequency of occurrence of the read error is reduced as compared with the magnetic disk apparatus of the above-described comparative example. Thus, access performance to the magnetic disk can be improved.

Note that the NAND 26 may store data that is different from the second servo data. In one example, when power supplied from the host 2 is interrupted due to power failure or the like, the data stored in the DRAM 25a may be saved to the NAND 26.

The NAND interface 32a is an interface circuit that controls an operation of the NAND 26. The NAND interface 32a performs a read process of reading the second servo data from the NAND 26 in response to, for example, a read request from the CPU 36, and transfers the read second servo data to the DRAM 25a.

The NAND interface 32a includes a register 321a, a buffer memory 322, a buffer management 323a, and a DMA controller 324.

The register 321a stores the first address value and the size of one track of the second servo data as a read target, and an address of the DRAM 25a as a transfer destination of the second servo data.

The buffer memory 322 temporarily stores the second servo data read from the NAND 26.

The buffer management 323a manages the buffer memory 322. Upon detecting that the second servo data as the read target is stored in the buffer memory 322, the buffer management 323a outputs a data transfer request to the DMA controller 324.

The DMA controller 324 acquires, from the register 321a, the first address value of the second servo data, the size of the second servo data per track, and the address of the DRAM 25a that is the transfer destination of the second servo data. The DMA controller 324 gives, to the NAND 26, the read request for the second servo data. When the data transfer request from the buffer management 323a is received, the DMA controller 324 starts transfer of the second servo data from the buffer memory 322 to the DRAM 25a. When the transfer of the second servo data is completed, the DMA controller 324 notifies the CPU 36 of transfer end.

The DRAM controller 33 is an interface circuit that controls the operations of the DRAM 25a. The DRAM controller 33 performs read/write processing on the DRAM 25a in response to the read request/write request from the CPU 36.

The DRAM controller 33 includes an arbiter 331. The arbiter 331 arbitrates access permissions to the DRAM 25a by a prescribed method when competition of access from the respective units to the DRAM 25a occurs. Therefore, an access sequence to the DRAM 25a is controlled.

The DRAM 25a is connected to the DRAM controller 33.

The DRAM 25a includes a user data buffer 251 and a second servo data buffer 253.

The user data buffer 251 can be used as a buffer for data transmitted to and received from the host 2. Specifically, the user data buffer 251 is configured to temporarily store the data to be written, the data read from the magnetic disk 11, or the like.

The second servo data buffer 253 is configured to temporarily store the second servo data transferred from the NAND 26.

The HDC 34 performs, for example, control of transmission and reception of data to and from the host 2 (see FIG. 1) via an I/F bus, and control of the DRAM 25a.

The RWC 35 modulates data to be written, which is supplied from the HDC 34, and supplies the modulated data to the preamplifier 23 (see FIG. 1). The RWC 35 demodulates a signal read from the magnetic disk 11 and supplied from the preamplifier 23, and outputs the signal as digital data to the HDC 34. In addition, the RWC 35 outputs the signal read from the magnetic disk 11 and supplied from the preamplifier 23, to the CPU 36 via the SVC 21. Specifically, for example, the RWC 35 receives, from the preamplifier 23, the first servo data read from the magnetic disk 11 and outputs the first servo data to the CPU 36.

The HDC 34 and the RWC 35 are communicably connected to the DRAM controller 33 by using a communication protocol conforming to a standard, for example, Serial ATA (SATA) or Serial Attached SCSI (SAS).

The SVC 21 is an integrated circuit that has a function as a driver to drive the SPM 12 and the VCM 16. The SVC 21 controls the rotation of the SPM 12 and the rotation of the VCM 16. In addition, the SCV 21 outputs the first servo data and the like output from the RWC 35, to the CPU 36.

The CPU 36 performs overall control of the SoC 31a in accordance with the firmware program. The CPU 36 includes a tightly-coupled memory (TCM) 361 that is a dedicated storage area so as to be accessible to various commands and data stored in the TCM 361. In one example, the CPU 36 performs positioning control of the magnetic head 22 by using the first servo data read from the magnetic disk 11 and stored in the TCM 361 via the RWC 35 and using the second servo data read from the NAND 26 and stored in the TCM 361 via the DRAM 25a.

The CPU 36 is communicably connected to each unit via the bus 37 using a communication protocol such as Advanced extensible Interface (AXI).

The line cache controller 38 is provided between the bus 37 and the DRAM controller 33. The line cache controller 38 has a line cache function to temporarily store addresses corresponding to various commands to the DRAM 25a from the CPU 36, such as reading of the servo data. The servo data read from the DRAM 25a is transferred to the TCM 361 via the line cache controller 38 and the bus 37.

Note that the configuration of the SoC 31a illustrated in FIG. 3 is an example, and it is not necessary to include all the component elements illustrated in FIG. 3, or other component elements may be included. In one example, the SoC 31a includes a DMA controller, which is not illustrated, between the DRAM controller 33 and the CPU 36, and the unillustrated DMA controller instead of the CPU 36 may read the second servo data from the DRAM 25a.

Next, the servo data acquisition process according to the first embodiment will be described with reference to FIG. 4. The servo data acquisition process is performed as part of the servo process.

Figure 4:
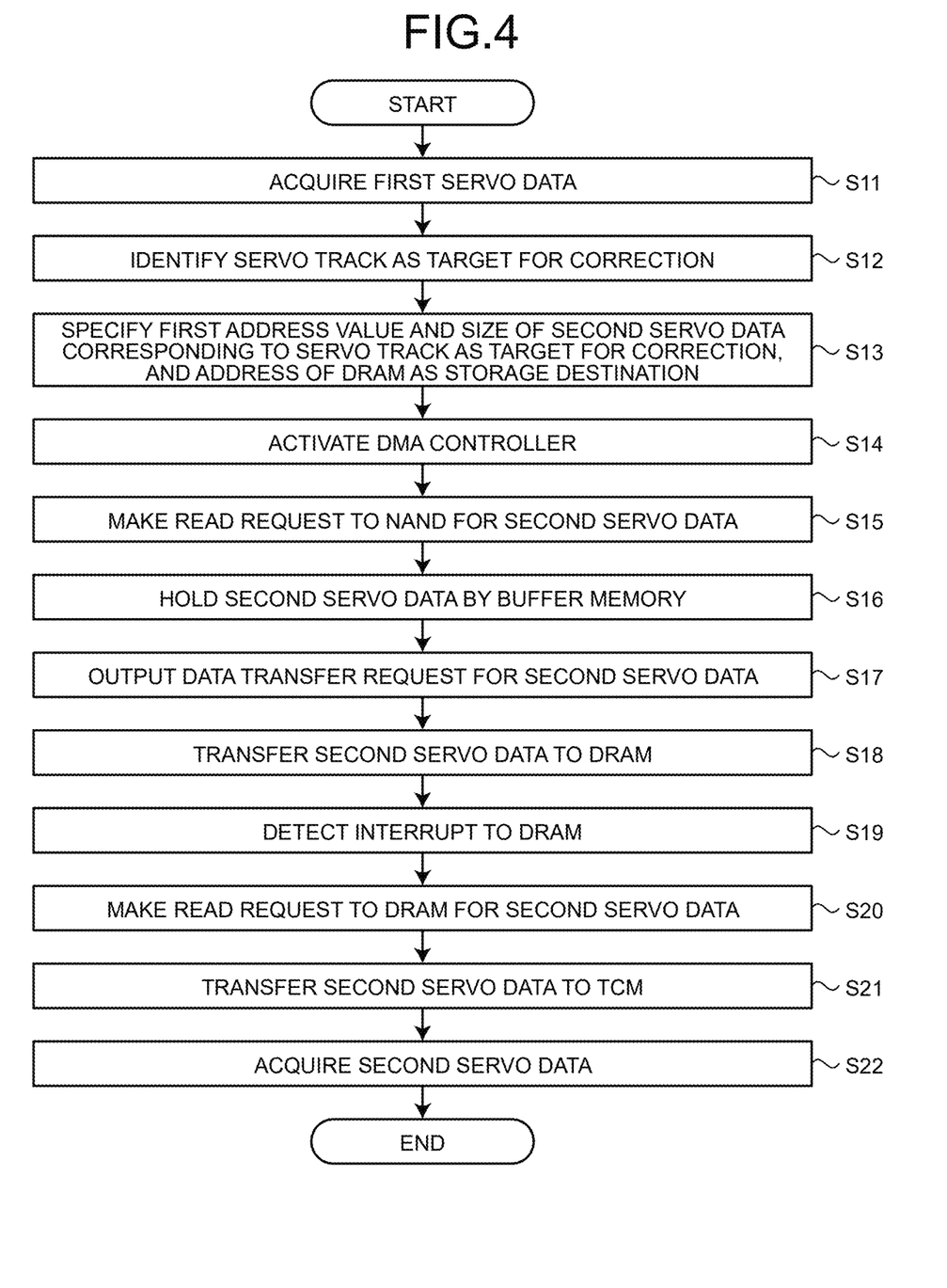
FIG. 4 is a flowchart illustrating an example of a servo data acquisition process according to the first embodiment.

FIG. 4 is a flowchart illustrating an example of the servo data acquisition process according to the first embodiment.

Prior to processing of Step S11, the magnetic head 22 starts seek operation. As described above, the servo sectors SV are spaced at the predetermined intervals in the circumferential direction of the magnetic disk 11. When passing over one servo sector SV, the magnetic head 22 reads the first servo data recorded in this servo sector SV. The read first servo data is stored in the TCM 361 of the CPU 36 via the RWC 35 and the SVC 21.

The CPU 36 acquires the first servo data from the TCM 361 (Step S11).

In the processing of Step S12 and subsequent steps, the CPU 36 acquires the second servo data corresponding to the first servo data from the NAND 26 on the basis of the first servo data.

Specifically, the CPU 36 identifies a servo track 41 as a target for RRO correction, on the basis of the first servo data (Step S12). More specifically, the CPU 36 identifies the servo track 41 as the target for correction, on the basis of the gray code.

The servo track 41 may be identified, for example, at the timing of command reordering of the access commands received from the host 2.

With respect to the second servo data corresponding to the servo track 41 as the target for correction, the CPU 36 specifies the first address value, the size of one track, and the address of the DRAM 25a as the transfer destination, on the register 321a of the NAND interface 32a (Step S13).

The CPU 36 activates the DMA controller 324 (Step S14).

The DMA controller 324 makes the read request to the NAND 26 for the second servo data (Step S15).

The buffer memory 322 temporarily stores the second servo data read (Step S16).

Upon detecting that the second servo data as the read target is stored in the buffer memory 322, the buffer management 323a outputs the data transfer request to the DMA controller 324 (Step S17).

In response to receiving the data transfer request, the DMA controller 324 transfers the second servo data from the buffer memory 322 to the DRAM 25a (Step S18). When the transfer of the second servo data is completed, the DMA controller 324 notifies the CPU 36 of transfer end.

The CPU 36 detects an interrupt to the DRAM 25a by receiving the notification indicating the transfer end (Step S19). The CPU 36 makes the read request to the DRAM 25a by using the line cache function (Step S20). As a result, the second servo data read from the DRAM 25a is transferred to the TCM 361 (Step S21). The CPU 36 acquires the second servo data (Step S22).

Through the above processing, the servo data acquisition process according to the first embodiment is finished. The CPU 36 uses the acquired first servo data and second servo data to perform positioning control of the magnetic head 22.

Conclusion

The magnetic disk apparatus 1a of the first embodiment includes: the magnetic disk 11 that stores the first servo data in the servo sector SV, the NAND 26 that stores the second servo data, the magnetic head 22 that writes data and reads data to and from the magnetic disk 11, the DRAM 25a that stores data to be written and data read from the magnetic disk, and the SoC 31a. When the magnetic head 22 passes over the servo sector SV, the SoC 31a reads the first servo data and acquires the second servo data corresponding to the first servo data from the NAND 26. The SoC 31a executes positioning control of the magnetic head 22 by using the first servo data and the second servo data.

In this way, storing the second servo data by the NAND 26 makes it possible for the SoC 31a to acquire the second servo data without accessing the magnetic disk 11. An amount of servo data read from the magnetic disk 11 is reduced, so that occurrence of read errors is also reduced. As a result, the servo process can be stabilized.

Second Embodiment

Hereinafter, a magnetic disk apparatus 1b according to a second embodiment will be described with reference to FIG. 5. The magnetic disk apparatus 1a of the first embodiment executes the servo process by storing the second servo data read from the NAND 26 in the DRAM 25a and transferring the second servo data from the DRAM 25a to the TCM 361. The magnetic disk apparatus 1b of the second embodiment is different from that of the first embodiment in that, the second servo data read from the NAND 26 is directly transferred to the TCM 361 without using the DRAM.

Figure 5:
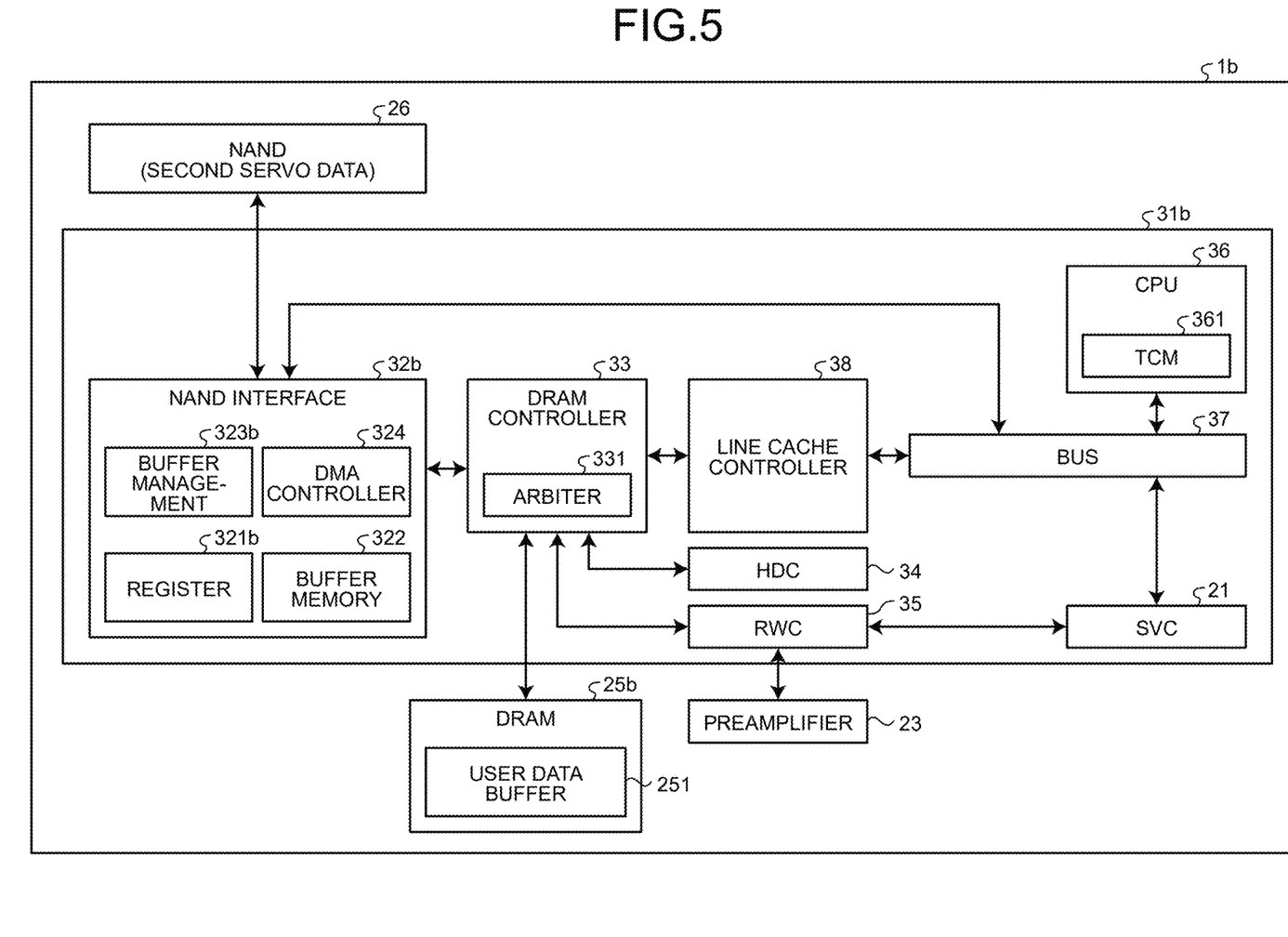
FIG. 5 is a block diagram illustrating an exemplary configuration of SoC according to a second embodiment.

FIG. 5 is a block diagram illustrating an exemplary configuration of SoC 31b according to the second embodiment. Note that, in the following description, when configurations and functions are similar to those of the first embodiment described above, the description thereof may be omitted.

As illustrated in FIG. 5, a DRAM 25b in the SoC 31b of the second embodiment does not include a buffer for the second servo data (namely, the second servo data buffer 253 in FIG. 3). As described above, the user data buffer 251 stores the read/data to be written.

The NAND interface 32b performs the read process of reading the second servo data from the NAND 26, and transfers the read second servo data to the TCM 361 without using the DRAM 25a.

Specifically, a register 321b of the NAND interface 32b holds the first address value and the size of one track of the second servo data as the read target, and an address of the TCM 361 as the transfer destination of the second servo data.

Upon detecting that the second servo data as the read target is stored in the buffer memory 322, a buffer management 323b outputs the data transfer request to the DMA controller 324.

The DMA controller 324 acquires, from the register 321b, the first address value of the second servo data, the size of the second servo data per track, and the address of the TCM 361 as the transfer destination of the second servo data. The DMA controller 324 makes the read request to the NAND 26 for the second servo data. In response to receiving the data transfer request from the buffer management 323b, the DMA controller 324 starts transfer of the second servo data from the buffer memory 322 to the TCM 361. When the transfer of the second servo data is completed, the DMA controller 324 notifies the CPU 36 of transfer end.

Next, the servo data acquisition process in the second embodiment will be described with reference to FIG. 6.

Figure 6:
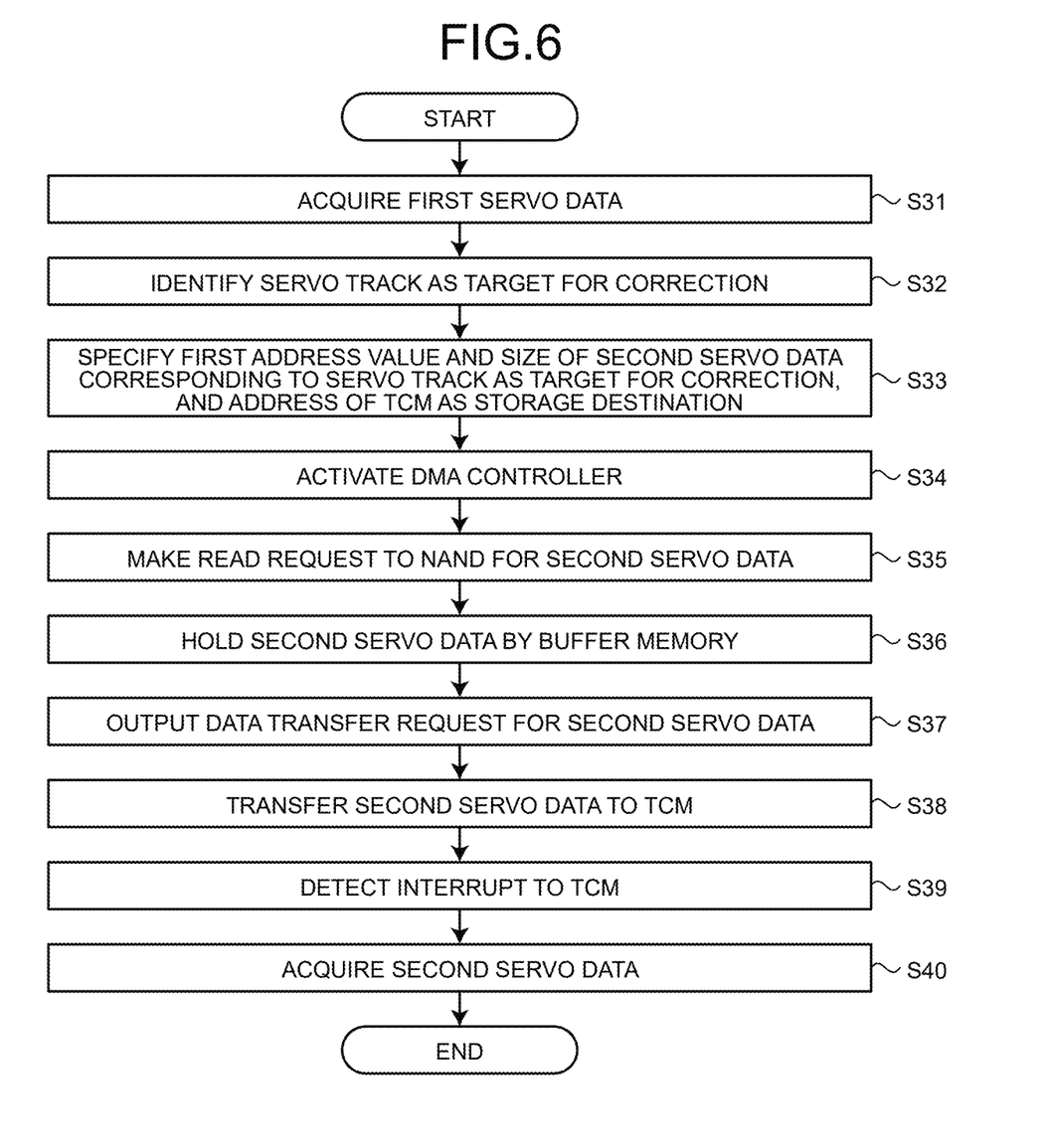
FIG. 6 is a flowchart illustrating an example of a servo data acquisition process according to the second embodiment.

FIG. 6 is a flowchart illustrating an example of a servo data acquisition process according to the second embodiment.

Prior to the process of Step S31, the magnetic head 22 starts the seek operation. The first servo data read by the magnetic head 22 is stored in the TCM 361 of the CPU 36.

The CPU 36 acquires the first servo data from the TCM 361 (Step S31).

In the processing of Step S22 and subsequent steps, the CPU 36 acquires the second servo data corresponding to the first servo data from the NAND 26 on the basis of the first servo data.

Specifically, the CPU 36 identifies the servo track 41 as the target for RRO correction, on the basis of the first servo data (Step S32).

With respect to the second servo data corresponding to the servo track 41 as the target for correction, the CPU 36 specifies the first address value, the size of one track, and the address of the TCM 361 as a storage destination, on the register 321a of the NAND interface 32a (Step S33).

Processing of subsequent Steps S34 to S37 corresponds to the processing of Steps S14 to 17 in FIG. 4, and the descriptions thereof are omitted.

After Step S37, in response to acquiring the data transfer request from the buffer management 323b, the DMA controller 324 transfers the second servo data from the buffer memory 322 to the TCM 361 without using the DRAM 25b (Step S38). When the transfer of the second servo data is completed, the DMA controller 324 notifies the CPU 36 of transfer end.

The CPU 36 detects an interrupt to the TCM 361 by receiving the notification indicating the transfer end (Step S39). The CPU 36 acquires the second servo data (Step S40).

Through the above processing, the servo data acquisition process according to the second embodiment is finished. The CPU 36 performs positioning control of the magnetic head 22 by using the acquired first servo data and second servo data.

Conclusion

In a case where a plurality of modules accesses the DRAM, waiting time may be caused in the read/write processing. Also, the DRAM itself has a latency as a property. Therefore, when the access for acquiring the servo data and the access for normal operation other than acquiring the servo data overlap in the DRAM, the processing speed of the servo process may decrease.

The magnetic disk apparatus 1b of the second embodiment acquires the second servo data read from the NAND 26 without using the DRAM 25b, and uses the second servo data for positioning control of the magnetic head 22. This configuration makes it possible to avoid causing of the waiting time in the DRAM 25b, enabling high-speed servo process.

OTHER EMBODIMENTS

In the embodiments described above, the second servo data is stored in the NAND 26. The storage location of the second servo data is not limited to the NAND 26, and may be stored in another non-volatile memory.

In the embodiments described above, the magnetic disk apparatus may be provided with a cache memory such as a static random access memory (SRAM). In one example, when the storage capacity of the TCM 361 is insufficient, the SRAM or the like may be used as a secondary cache.

While some embodiments have been described, these embodiments have been presented by way of example only and are not intended to limit the scope of the inventions. Indeed, the novel embodiments described herein can be embodied in a variety of other forms; moreover, various omissions, substitutions and changes can be made without departing from the gist of the inventions. These embodiments or modifications thereof are included in the scope or the gist of the inventions and are included in the inventions described in the claims and an equivalent scope thereof.

What is claimed is:

1. A magnetic disk apparatus comprising:
a magnetic disk on which a servo sector where first servo data is recorded is provided;
a magnetic head configured to write data and read data to and from the magnetic disk;
a first memory configured to store data to be written and store data read from the magnetic disk;
a second memory configured to store second servo data; and
a controller configured to
acquire the second servo data corresponding to the first servo data from the second memory based on the first servo data read by the magnetic head when passing over the servo sector, and
execute positioning control of the magnetic head by using the first servo data and the second servo data.

2. The magnetic disk apparatus according to claim 1, wherein the controller is configured to
transfer, to the first memory, the second servo data acquired from the second memory,
read the second servo data stored in the first memory, and
execute positioning control of the magnetic head by using the first servo data and the second servo data read from the first memory.

3. The magnetic disk apparatus according to claim 2, wherein
the controller includes an interface circuit configured to control an operation of the second memory, and
the controller is configured to
cause the interface circuit to read the second servo data,
cause the interface circuit to transfer the second servo data to the first memory, and
acquire the second servo data from the first memory.

4. The magnetic disk apparatus according to claim 1, wherein the controller is configured to
acquire, without using the first memory, the second servo data acquired from the second memory, and
execute the positioning control of the magnetic head.

5. The magnetic disk apparatus according to claim 4, wherein
the controller includes an interface circuit configured to control an operation of the second memory, and
the controller is configured to
cause the interface circuit to read the second servo data, and
acquire the second servo data from the interface circuit without using the first memory.

6. The magnetic disk apparatus according to claim 1, wherein the second servo data is data indicating a correction amount of RRO.

7. A method of executing positioning control of a magnetic head in a magnetic disk apparatus, the magnetic disk apparatus including the magnetic disk, a magnetic head serving to write data and read data to and from the magnetic disk, a first memory serving to store data to be written and store data read from the magnetic disk, and a second memory different from the first memory, the method comprising:
acquiring second servo data stored in the second memory, the second servo data corresponding to first servo data, the acquiring of the second servo data being performed based on the first servo data read by the magnetic head when passing over a servo sector where the first servo data is recorded on the magnetic disk; and
executing positioning control of the magnetic head by using the first servo data and the second servo data.

8. The method according to claim 7, further comprising:
transferring, to the first memory, the second servo data acquired from the second memory; and
reading the second servo data stored in the first memory, wherein the executing of positioning control of the magnetic head is performed by using the first servo data and the second servo data read from the first memory.

9. The method according to claim 8, wherein
the magnetic disk apparatus includes an interface circuit serving to control an operation of the second memory,
the method further comprises causing the interface circuit to read the second servo data,
wherein the second servo data to be transferred to the first memory is the second servo data read from the second memory by the interface circuit.

10. The method according to claim 7, further comprising acquiring, without using the first memory, the second servo data acquired from the second memory.

11. The method according to claim 10, wherein
the magnetic disk apparatus includes an interface circuit serving to control an operation of the second memory,
the method further comprises causing the interface circuit to read the second servo data,
wherein the second servo data acquired without using the first memory is the second servo data read from the second memory by the interface circuit.

12. The method according to claim 7, wherein the second servo data is data indicating a correction amount of RRO.

* * * * *